United States Patent [19]
Ueda

[11] Patent Number: 5,460,581
[45] Date of Patent: Oct. 24, 1995

[54] AUTOMATIC TRANSMISSION CONTROL APPARATUS

[75] Inventor: Yoshiaki Ueda, Fuji, Japan

[73] Assignee: Jatco Corporation, Shizuoka, Japan

[21] Appl. No.: 91,207

[22] Filed: Jul. 14, 1993

[30] Foreign Application Priority Data

Jul. 22, 1992 [JP] Japan .................................. 4-216415

[51] Int. Cl.⁶ .......................... G05D 17/02; B60K 41/06
[52] U.S. Cl. ........................ 477/126; 477/109; 477/906
[58] Field of Search ............................ 477/126, 906, 477/907, 109, 110, 125

[56] References Cited

U.S. PATENT DOCUMENTS

| | | | |
|---|---|---|---|
| 4,419,909 | 12/1983 | Opperud et al. | 477/126 |
| 4,838,124 | 6/1989 | Hamano et al. | 477/906 X |
| 5,103,692 | 4/1992 | Shimanaka et al. | 477/906 X |
| 5,171,176 | 12/1992 | Gebhardt et al. | 477/109 X |
| 5,216,938 | 6/1993 | Yamaguchi | 477/906 X |

FOREIGN PATENT DOCUMENTS

| | | | |
|---|---|---|---|
| 0242086 | 10/1987 | European Pat. Off. | 477/906 |
| 57-94531 | 6/1982 | Japan . | |
| 61-113524 | 5/1986 | Japan . | |
| 61-282135 | 12/1986 | Japan . | |
| 1-116823 | 8/1989 | Japan . | |
| 3061760 | 3/1991 | Japan | 477/906 |
| 3-56845 | 5/1991 | Japan . | |

*Primary Examiner*—Charles A. Marmor
*Assistant Examiner*—Nathan O. Jensen
*Attorney, Agent, or Firm*—Oliff & Berridge

[57] ABSTRACT

A control apparatus for an automatic transmission in which when a select position of a select lever operated by a driver is detected by an inhibitor switch, and a detected select position is a neutral position and/or a reverse position, ignition timing is retarded or fuel supply is reduced to reduce output torque of an engine, the output torque of the engine is also reduced when abnormal detection of the select position is determined due to a disconnection of the inhibitor switch or the like, thereby preventing transmission of excessive output torque to a frictional engaging element to achieve a reverse and driving force transmission members connecting to the frictional engaging element.

10 Claims, 5 Drawing Sheets

| SELECT POSITION / FRICTIONAL ENGAGING ELEMENT | P | R | N | D 1ST SPEED | D 2ND SPEED | D 3RD SPEED | D 4TH SPEED | 2 1ST SPEED | 2 2ND SPEED | 1 |
|---|---|---|---|---|---|---|---|---|---|---|
| REVERSE CLUTCH 21 | | ○ | | | | | | | | |
| 3RD/4TH SPEED CLUTCH 18 | | | | | | ○ | ○ | | | |
| FORWARD CLUTCH 19 | | | | ○ | ○ | ○ | | ○ | ○ | ○ |
| OVERRUN CLUTCH 20 | | | | | △ | △ | | | | |
| 2ND/4TH SPEED BRAKE 23 | | | | | ○ | | ○ | | ○ | ○ |
| LOW AND REVERSE BRAKE 22 | | ○ | | | | | | | | ○ |

FIG.5

AUTOMATIC TRANSMISSION CONTROL APPARATUS

BACKGROUND OF THE INVENTION

1. Field of the Invention

The present invention relates to a control apparatus for an automatic transmission for reducing an output torque of an engine when a predetermined speed range is selected.

2. Description of the Prior Art

In an automatic transmission using a planetary gear system, an input shaft of the transmission connecting to a crank shaft of an engine through a torque converter is provided with a plurality of sets of planetary gears and a plurality of frictional engaging elements for binding a plurality of rotational elements forming the planetary gear system, and a combination of engaging conditions of the frictional engaging elements is changed over hydraulically to achieve a desired speed position.

There are proposed automatic transmission control apparatus, for example, in Japanese Patent Application Laying-open No. 61-113524 and Japanese Utility Model Application Laying-open No. 3-56845, in which the transmission torque capacity of a frictional engaging element engaging at a specific speed position is set to a small value, and when the specific speed position is selected, the engine output torque is forcibly reduced independent of the manipulated variable of an accelerator pedal by a driver, thereby providing a compact and lightweight automatic transmission, especially, one which has a reduced length of the transmission shaft.

In the automatic transmission control apparatus disclosed in Japanese Patent Application Laying-open No. 61-113524, at a reverse where the transmission generally does not require large output torque, the engine output torque is reduced to prevent a vehicle from traveling with excessive output torque during backward traveling. This enables the frictional engaging element engaging at the reverse to be of small transmission torque capacity, and the driving force transmission member connecting to the frictional engaging element to be one which has low strength, thereby achieving a lightweight automatic transmission.

Furthermore, in the automatic transmission control apparatus disclosed in Japanese Utility Model Application Laying-open No. 3-56845, when the engine is in high-speed rotation, high-torque operation region with the automatic transmission at the reverse, forcibly reduces the output torque of the engine independent of the manipulated variable of the accelerator pedal by the driver, thereby preventing the vehicle from starting abruptly.

In the automatic transmission control apparatus disclosed in Japanese Patent Application Laying-open No. 61-113524 and Japanese Utility Model Application Laying-open No. 3-56845, selection of the reverse is determined by a detection signal from an inhibitor switch linked to a select lever operated by the driver, and the detection of the reverse by the inhibitor switch is normally carried out. However, no contingency is made for the case where a malfunction occurs in the reverse position detection mechanism including the inhibitor switch.

Therefore, if breaking of signal cables occurs in the inhibitor switch or the like for detecting the reverse for some reason, it is impossible to determine the selection of the reverse even if the select lever is at a reverse speed select position. As a result, even when the reverse is selected, the engine output torque is not reduced and remains at a magnitude corresponding to the manipulated variable of the accelerator pedal by the driver, and there is some fear that excessive transmission torque is applied to a frictional engaging element engaging at the reverse and driving force transmission members connecting to the frictional engaging element.

SUMMARY OF THE INVENTION

In accordance with the present invention, there is provided a control apparatus for an automatic transmission having a select lever operated by a driver;

means for detecting a select position of the select lever;

means for reducing output torque of an engine; and means for operating the engine output torque reduction means when the select position detected by the select position detection means is at a predetermined position; the control apparatus comprising:

means for determining an abnormal detection of the select position; and means for operating the engine output torque reduction means when abnormal detection of the select position is determined by the select position detection abnormality determination means.

In this case, an inhibitor switch can be used as the select position detection means. The predetermined position at which the predetermined position control means operates is effective at a neutral position and/or the reverse position. Furthermore, it is also possible to provide warning means for making an abnormality known to the driver in association with the operation of the abnormality control means.

With the present invention, when it is expressly known from a detection signal from the select position detection means that the select position of the select lever is at the neutral position and/or reverse position, the predetermined position control means operates the engine output torque reduction means to reduce the engine output torque. When abnormal detection of select position is determined in the select position detection abnormality determination means, the abnormality control means operates the engine output torque reduction means to reduce the engine output torque.

Anyway, even when abnormal conditions occur such that the reverse position cannot be detected, the engine output torque is reduced, and a malfunction such that excessive output torque is accidentally transmitted to a frictional engaging element for achieving the reverse or driving force transmission members linked to the frictional engaging element can be positively prevented.

The above and other objects, effects, features and advantages of the present invention will become more apparent from the following description of embodiments thereof taken in conjunction with the accompanying drawings.

DETAILED DESCRIPTION OF THE PREFERRED EMBODIMENT

Figure 1:
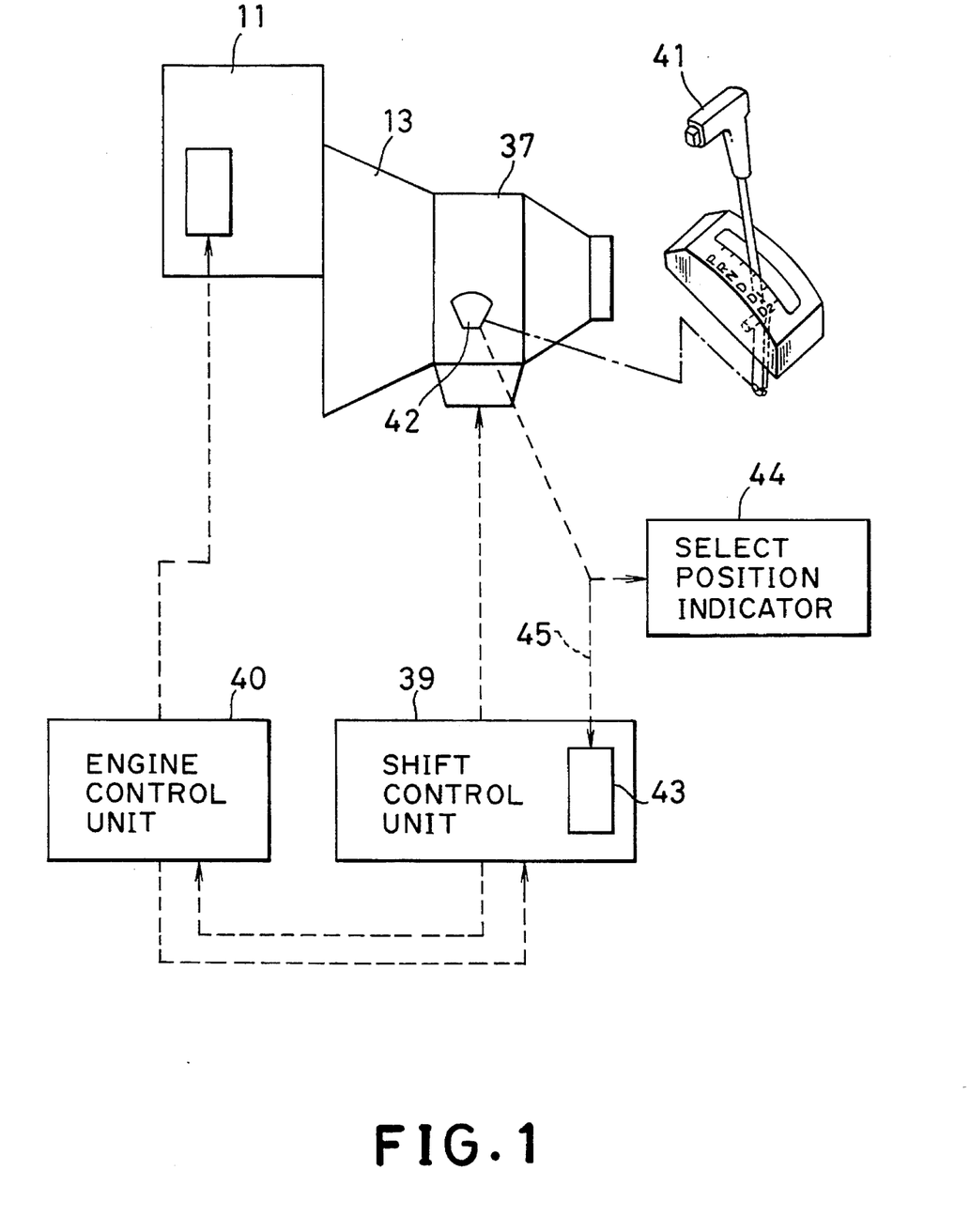
FIG. 1 is a schematic illustration showing an embodiment to which an automatic transmission control apparatus according to the present invention is applied to an automatic transmission having four speeds forward and one reverse.
Figure 2:
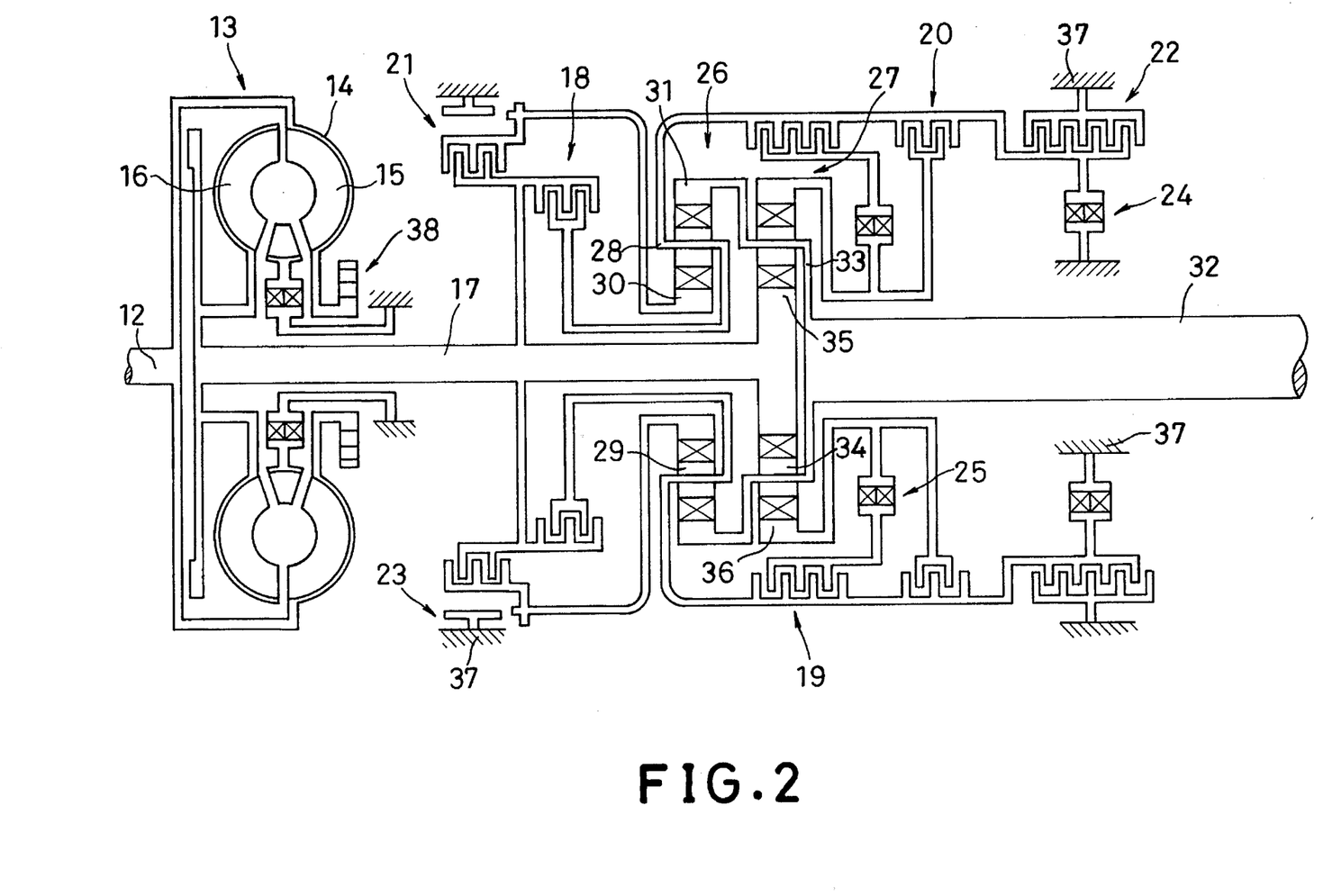
FIG. 2 is a schematic illustration showing a power train of the automatic transmission in the embodiment.

As shown in FIG. 1 and FIG. 2, a drive shaft 12 linked to a crank shaft (not shown) of an engine 11 is connected to a pump impeller 15 formed integrally with an input case 14 of a torque converter 13. A turbine 16 of the torque converter 13 opposing the pump impeller 15 is connected with an input shaft (hereinafter referred to as "transmission input shaft") 17 of a gear box which achieves four forward speeds and one reverse.

The gear box in the present embodiment comprises four sets of frictional clutches 18, 19, 20, and 21, two sets of frictional brakes 22 and 23, two sets of one way clutches 24 and 25, and two sets of planetary gears 26 and 27. The two sets of planetary gears 26 and 27 comprise a front planetary carrier 28 rotatably engaging with the transmission input shaft 17, a plurality of front pinion gears 29 rotatably mounted individually to the front planetary carrier 28, a front sun gear 30 rotatably engaging with the front planetary carrier 28 and engaging with the front pinion gears 29, a front internal gear 31 surrounding the front sun gear 30 to engage with the front pinion gears 29, a rear planetary carrier 33 with its front end connected to the front internal gear 31 and its rear end connected to the front end of an output shaft 32 of the gear box (hereinafter referred to as the transmission output shaft), a plurality of rear pinion gears 34 rotatably mounted individually to the rear planetary carrier 33, a rear sun gear 36 provided at the rear end of the transmission input shaft 17 and engaging with the rear pinion gears 34, and a rear internal gear 36 surrounding the rear sun gear 35 to engage with the rear pinion gears 34.

The front end of the front planetary carrier 28 is connected to the transmission input shaft 17 through the 3rd/4th-speed clutch 18. Furthermore, the rear end of the front planetary carrier 28 is connected to a transmission case 37 through the low/reverse brake 22 and the one way clutch 24 for 1st-speed. The front planetary carrier 28 and the rear internal gear 36 are connected individually through the forward clutch 19 and the overrun clutch 20 parallel to the forward clutch 19. The one way clutch 25 for forward speeds is disposed between the forward clutch 19 and the rear internal gear 36. Furthermore, the front sun gear 30 is connected to the transmission input shaft 17 through the reverse clutch 21 and to the transmission case 37 through the 2nd/3rd-speed brake 23. The output torque of the engine 11 through the planetary gears 26 and 27 are transmitted from the transmission output shaft 32 to driving wheels (not shown).

The individual frictional clutches 18 to 21 and the frictional brakes 22 and 23 as frictional engaging elements comprise hydraulic devices provided with engaging piston devices or servo devices. These hydraulic devices are operated through a shift control unit 39 by hydraulic oil generated by an oil pump 38 connected to the input case 14 of the torque converter 13.

The shift control unit 39, which exchanges control information and the like with an engine control unit 40 for controlling the operation condition of the engine 11, sets an optimum speed position according to the select position of the select lever 41 selected by the driver and an operation condition of a vehicle (not shown). Basically, a current speed position is selected from a map previously stored in a ROM (not shown) according to the vehicle speed and the throttle opening. Information of the vehicle speed and the throttle opening is given from the engine control unit 40.

The detailed structure and functions are already known, for example, through Japanese Patent Application Laying-open No. 61-282135 and the like. Briefly describing, selective engagement of the individual frictional engaging elements 18 to 21 is carried out according to the position selected by the driver of the select lever 41 provided on the vehicle and the operation condition of the vehicle, and various speed positions are automatically achieved through the shift control unit 39 according to various information related to the operation condition of the vehicle from the engine control unit 40 which controls the operation condition of the engine 11.

Figure 3:
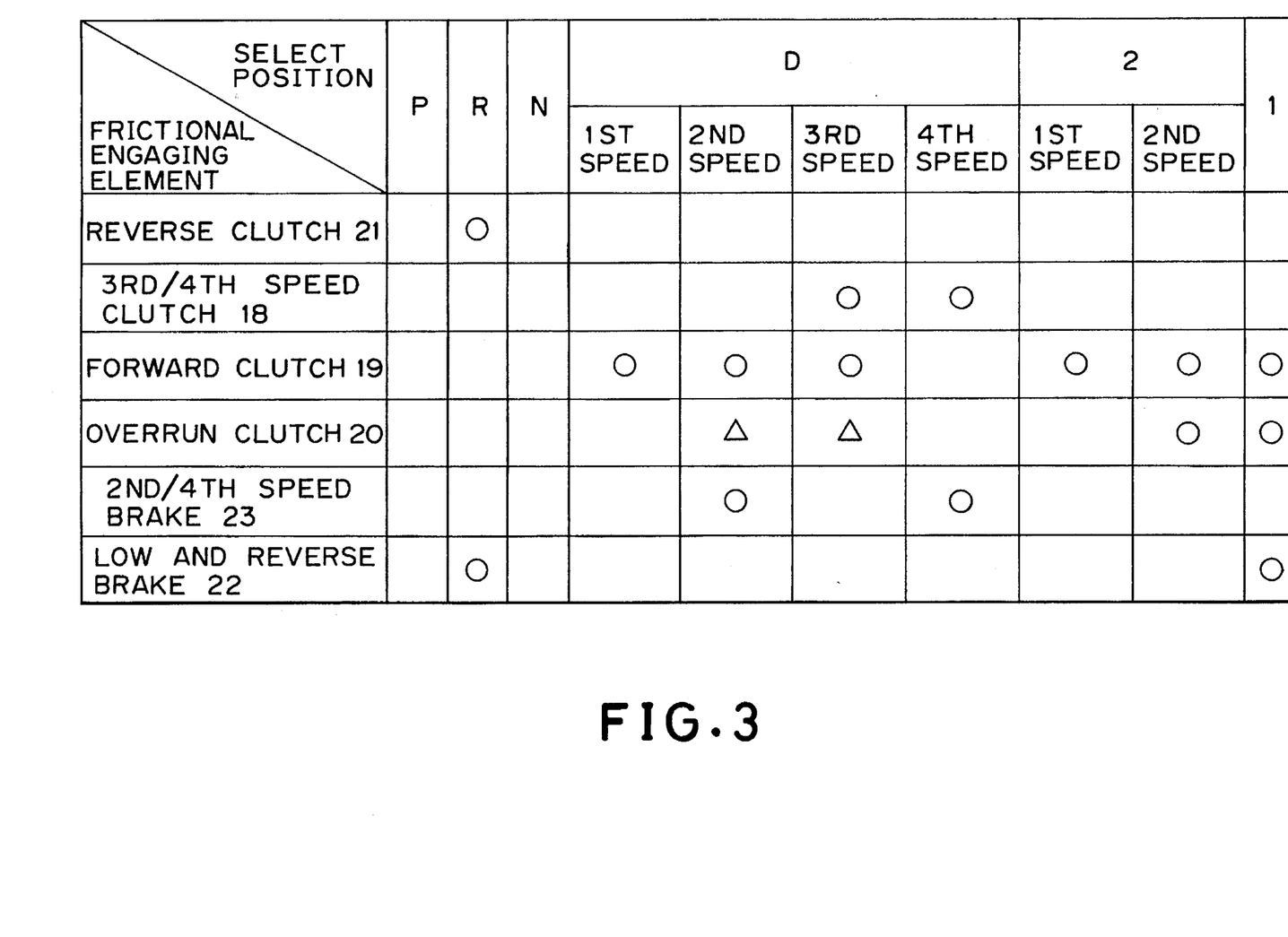
FIG. 3 shows the relation between the engagement conditions of frictional engaging elements and individual speed positions of the automatic transmission in the embodiment.

The select positions by the select lever 41 include P (parking), R (reverse), N (neutral), D (automatic change for 1st–3rd speeds or 1st–4th speeds), 2 (automatic change for 1st–2nd speeds), and 1 (fixed to the 1st speed). With the select lever 41 set to the D range, when an auxiliary switch (over-drive switch) (not shown) is operated, selection can be changed over to the automatic 1st–3rd speeds or automatic 1st–4th speeds. When the select lever 41 is held at the above select positions, the individual frictional engaging elements function as shown in FIG. 3. In FIG. 3, the symbol ○ indicates an engagement condition achieved by the hydraulic operation and the symbol Δ indicates that an engagement condition is achieved only when the opening of a throttle valve (not shown) is in a range smaller than a predetermined opening.

As can be seen from FIG. 3, the reverse clutch 21 engages only when the reverse is achieved. That is, when the driver operates the select lever 41 to select the reverse position, the reverse clutch 21 and the low/reverse brake 22 engage to achieve the reverse, rotation of the transmission input shaft 17 is transmitted from the reverse clutch 21 to the front sun gear 30, and in a reverse condition to the transmission output shaft 32 from the front internal gear 31 and the rear planetary carrier 33 integral with the front internal gear 31 through the front pinion gear 29 mounted on the front planetary carrier 28 which is in a fixed condition.

In general, since it is a very rare case that the vehicle is operated by large output torque when the reverse is achieved, it is unnecessary to linearly control the output torque of the engine 11 relative to the manipulated variable of an accelerator pedal (not shown). Furthermore, it is desirable that the shaft length of the gear box (length from the front end of the transmission input shaft 17 to the rear end of the transmission output shaft 32) is reduced as possible to make the gear box compact and lightweight.

For the above reasons, in the present embodiment, the number of clutch discs (not shown) forming the reverse clutch (a multiplate wet clutch) 21 is decreased to reduce the torque capacity of the reverse clutch 21, and the rigidity of the structural member from the transmission input shaft 17 through the reverse clutch 21 to the front sun gear 30 is set to a smaller value than other parts.

With such arrangement, when the reverse is achieved, a control is carried out such that the output torque of the engine 11 is reduced to prevent overloading on the reverse clutch 21 itself and members from the transmission input shaft 17 through the reverse clutch 21 to the front sun gear 30 by retarding the ignition timing advance to a predetermined extent according to the manipulated variable of the accelerator pedal.

Figure 4:
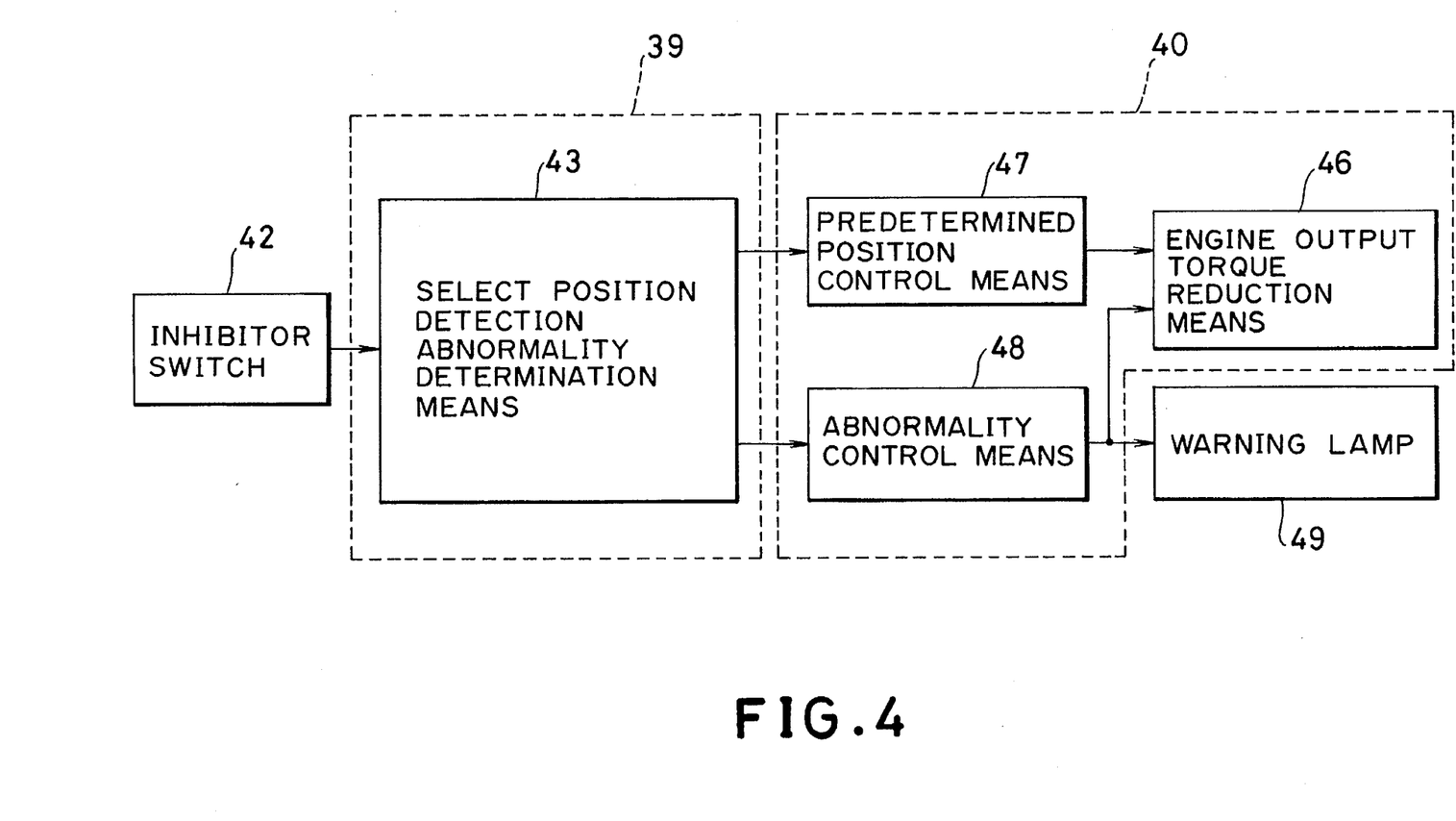
FIG. 4 is a control block diagram of the embodiment.

Specifically, as shown in FIG. 1 and FIG. 4, the select lever 41 operated by the driver is connected with an inhibitor switch 42 which detects the six select positions of P, R, N, D, 2, and 1 of the select lever 41. The inhibitor switch 42 is mounted to the above transmission case 37. A detection signal corresponding to the select position of the select lever 41 by the inhibitor switch 42 is outputted individually to select position detection abnormality determination means 43 incorporated in the transmission control unit 39 and a select position indicator 44 provided on an instrument panel in front of a driver's seat (not shown).

The select position abnormality determination means 43 determines the presence of an abnormality according to select position information detected by the inhibitor switch 42. That is, if no select position information is obtained due to breakage of a signal line or the like, the select position detection is determined to be abnormal, and a select position detection abnormality is outputted to the engine control unit 40. When two detection signals are outputted simultaneously that indicates an abnormality due to a short of the signal line 45 or the like or a malfunction of circuit contact at the transmission control unit 39 side. In that case, a select position detection abnormality is also outputted to the engine control unit 40.

The select position indicator 44 displays the select position of the select lever 41 by a detection signal from the inhibitor switch 2 to make the select position known to the driver. Since the detailed structure and the like of the inhibitor switch 42 is already known from Japanese Utility Model Application Laying-open Nos. 57-94531 and 1-116823, further description thereof is omitted.

The engine control unit 40 incorporates engine output torque reduction means 46 for reducing the output torque of the engine 11 by decreasing the ignition timing advance, and predetermined position control means 47 and abnormality control means 48 for individually controlling the operation of the engine output torque reduction means 46. Furthermore, the abnormality control means 48 is connected with a warning lamp 49 for making the operator informed of generation of an abnormal detection of the select position. The warning lamp 49 is mounted on the instrument panel in front of the driver's seat, which is lit by the abnormality control means 48 when an abnormal detection of select position occurs.

The predetermined position control means 47 in the present embodiment, when the select position detected by the inhibitor switch 40 is one of the parking, reverse, and neutral positions, outputs ignition timing advance decrease information to the engine output torque reduction means 46 from an ignition timing map previously stored in a ROM in the engine control unit 40 according to the manipulated variable of the accelerator pedal to operate the engine output torque reduction means 46. However, when the select position is the parking position or the neutral position, the decrease in ignition timing advance is set to a particularly large value only in a region where the manipulated variable of the accelerator pedal is large.

The abnormality control means 48, when the select position abnormality determination means 43 determines an abnormal detection of select position, outputs ignition timing advance decrease information to the engine output torque reduction means 46 from an ignition timing map previously stored in a ROM in the engine control unit 40 according to the manipulated variable of the accelerator pedal to operate the engine output torque reduction means 46 and light the warning lamp 49.

That is, the predetermined position control means 47 and the abnormality control means 48 output a signal to reduce the output torque of the engine 11 to the engine output torque reduction means 46 except for a case where the select position of the select lever 41 is detected to be one of the select positions D, 2, and 1. This can reduce the output torque of the engine 11 and protects the reverse clutch 21 itself and the members from the transmission input shaft 17 through the reverse clutch 21 to the front sun gear 30 of course when the reverse position is selected and even when no select position information to inform the reverse position is inputted due to an open circuit or the like.

The engine output torque reduction means 46 is to decrease the ignition timing advance and reduce the output torque of the engine 11 according to the ignition timing advance decrease information from the predetermined position control means 47 and the abnormality control means 48. Since the detailed structure of the engine output torque reduction means 46 is already known through Japanese Patent Application Laying-open No. 61-282135 and the like, further description thereof is omitted.

Figure 5:
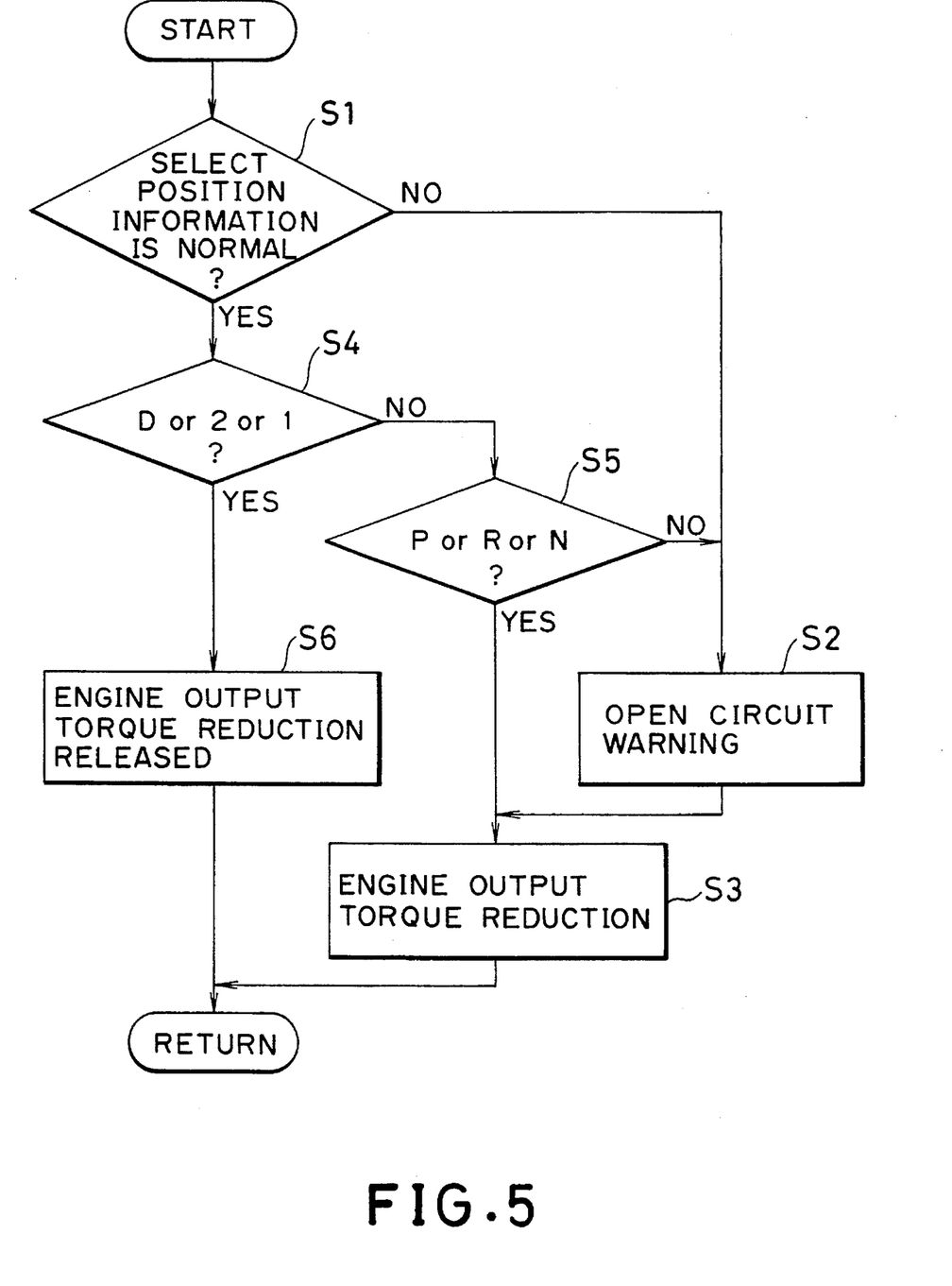
FIG. 5 is a control flow chart of the embodiment.

The control flow of the transmission control unit 39 and the engine control unit 40 in the present embodiment is shown in FIG. 5. Specifically, in step S1, the select position detection means 43 determines whether or not the select position information is normal. When, in step S1, the select position detection means 43 determines the select position information not to be normal, the abnormality control means 48, in step S2, lights the warning lamp 49 to give a warning of the breakage according to the information from the select position detection abnormality determination means 43 and, in step S3, operates the engine output torque reduction means 46 to reduce the output torque of the engine 11. Since this reduces the output torque of the engine 11 even when the reverse position selection is not detected in spite of the reverse position selected, no excessive torque is transmitted to the reverse clutch 21, thereby positively protecting the reverse clutch 21 and the like.

When it is determined in step S1 that the select position information are the same, determination is made in step S4 as to whether or not the select position information is at one of D, 2, and 1 from a detection signal from the inhibitor switch 18. When it is determined in step S4 that the select position information is not at any one of D, 2, and 1, determination is made in step S5 as to whether or not the select position signal is at one of P, R, and N.

When it is determined in step S5 that the select position is not at any of P, R, and N, that is, there is a possibility of an open circuit in the inhibitor switch 40 or the like, an open circuit warning is outputted in step S2, and the processing goes to step S3 where the output torque of the engine 11 is reduced. When it is determined in step S5 that the select position is at one of P, R, and N, in step S3, the output torque of the engine 11 is reduced by the engine output torque reduction means 46 through the predetermined position control means 47. This can positively reduce the output of the engine 11 when the select lever 41 is at the neutral select position where it is not necessary that the output torque of the engine 11 to be increased or when the select lever 41 is at the reverse select position where it is necessary that the output torque of the engine 11 be suppressed.

On the other hand, when it is determined in step S4 that the select lever 41 is at one of D, 2, and 1, in step S6, the control to reduce the output torque of the engine 11 is released so that a normal ignition timing control is performed to obtain an output torque according to the manipulated variable of the accelerator pedal.

The present embodiment has been described for an automatic transmission for achieving four forward speeds and one reverse. However, the present embodiment can also be applied to an automatic transmission capable of achieving other speeds and an automatic transmission equipped with a gear transmission apparatus of a structure other than shown in FIG. 2 as well. Furthermore, in addition to retarding the ignition timing advance as used in the present embodiment, the output torque of the engine 11 can alternatively be reduced by reducing the amount of fuel supply or intake air, or by shifting the open/close timing of the intake and exhaust valves.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A control apparatus for an automatic transmission having a select lever operated by a driver, means for detecting a select position of said select lever, means for reducing output torque of an engine, and means for operating said engine output torque reduction means when the select position detected by said select position detection means is at a reverse position, wherein said operating means inhibits the operation of said engine output torque reduction means when the select position is at a forward position, said control apparatus comprising:

means for determining an abnormal detection of the select position when it is determined that the select position detected by said select position detection means is not at any of a parking position, a reverse position, a neutral position, and a forward position; and means for operating said engine output torque reduction means when abnormal detection of the select position is determined by said select position detection abnormality determination means.

2. The control apparatus for an automatic transmission as claimed in claim 1 wherein said select position detection means is an inhibitor switch.

3. The control apparatus for an automatic transmission as claimed in claim 1 further comprising means for warning of an abnormality in association with the operation of said abnormality control means.

4. A control apparatus for an automatic transmission having a select lever operated by a driver, means for detecting a select position of said select lever, means for reducing output torque of an engine, and means for operating said engine output torque reduction means when the select position detected by said select position detection means is at a reverse position, said control apparatus comprising:

means for determining an abnormal detection of the select position, and means for operating said engine output torque reduction means when abnormal detection of the select position is determined by said select position detection abnormality determination means wherein said operation means inhibits the operation of said engine output torque reduction means when the select position is at a forward position.

5. A control apparatus for an automatic transmission having a select lever operated by a driver, means for detecting a select position of said select lever, means for reducing output torque of an engine, and means for operating said engine output torque reduction means when the select position detected by said select position detection means is at a reverse position, said control apparatus comprises:

means for determining an abnormal detection of the select position when it is determined that the select position detected by said select position detection means is not at any of a parking position, a reverse position, a neutral position, and a forward position; and means for operating said engine output torque reduction means when abnormal detection of the select position is determined by said select position detection abnormality determination means.

6. A control method for an automatic transmission having the steps of detecting a select position of a select lever operated by a driver, and reducing output torque of an engine when said select position detected in said select position detection step is a reverse position, said reducing step being inhibited when the select position of said select lever is at the forward position, said control method further comprising the steps of:

determining an abnormal detection of the select position, the abnormal detection of the select position being determined when the select position is not at any of a parking position, a reverse position, a neutral position, and a forward position; and reducing said output torque of said engine when an abnormal detection of said select position is determined in said select position detection abnormality determination step.

7. The control method for an automatic transmission as claimed in claim 6 wherein said select position detection step is achieved by an inhibitor switch.

8. The control method for an automatic transmission as claimed in claim 6, further comprising the step of warning of an abnormality in association with the operation of said abnormal operation control step.

9. A control method for an automatic transmission having the steps of detecting a select position of a select lever operated by a driver, and reducing output torque of an engine when said select position detected in said select position detection step is a reverse position, said control method further comprising the steps of:

determining an abnormal detection of the select position; and reducing said output torque of said engine when an abnormal detection of said select position is determined in said select position detection abnormality determination step, wherein said reducing step is inhibited when the select position of said select lever is at the forward position.

10. A control method for an automatic transmission having the steps of detecting a select position of a select lever operated by a driver, and reducing output torque of an engine when said select position detected in said select position detection step is a reverse position, said control method further comprising the steps of:

determining an abnormal detection of the select position, abnormal detection of the select position being determined when the select position is not at any of a parking position, a reverse position, a neutral position, and a forward position; and reducing said output torque of said engine when an abnormal detection of said select position is determined in said select position detection abnormality determination step.

* * * * *